Figure 1:
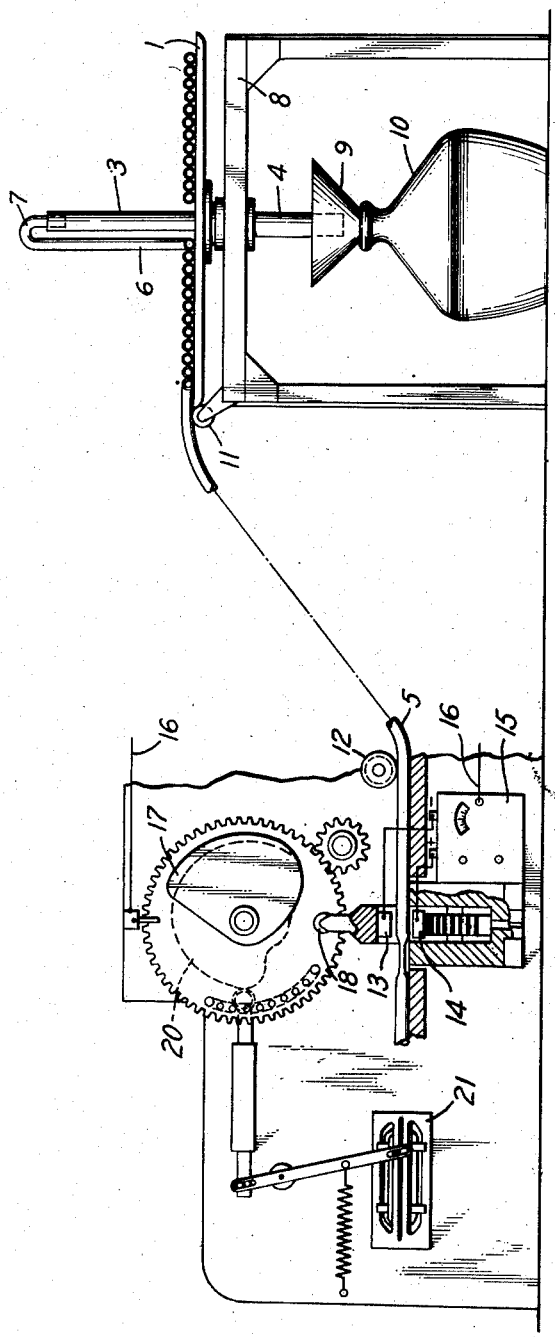

INVENTOR
LEOPOLD RADO

Aug. 13, 1957 L. RADO 2,802,324
APPARATUS FOR THE PRODUCTION OF LIQUID-FILLED AIRTIGHTLY
SEALED CONTAINERS MADE FROM THERMOPLASTIC TUBING
Filed Aug. 17, 1953 2 Sheets-Sheet 2

INVENTOR
LEOPOLD RADO

United States Patent Office 2,802,324
Patented Aug. 13, 1957

2,802,324

APPARATUS FOR THE PRODUCTION OF LIQUID-FILLED AIRTIGHTLY SEALED CONTAINERS MADE FROM THERMOPLASTIC TUBING

Leopold Rado, London, England; Dorothy Frances Pickering, executrix of said Leopold Rado, deceased Application August 17, 1953, Serial No. 374,618

4 Claims. (Cl. 53—183)

The subject of the present invention is an improved apparatus for the production of liquid-filled airtightly sealed containers made from thermoplastic tubing by the application of pressure at predetermined distances to the filled tubing walls by a tool or a pair of tools, thereby displacing the contents of the filled tubing at the pressure places and causing the tubing walls to flatten and contact each other thereat, whereafter by the application of heat generated by the pressing tool or pair of tools to the said flattened tubing walls at the pressure places, the walls of the tubing become welded together thereat, and a row of filled and airtightly sealed containers are thus produced which are thereafter separated from each other by cutting along the middle of the width of the welded place.

For the production of containers in accordance with the above described process, a considerable length of tubing is filled with fluid substance, and one end thereof is sealed and the other end left open. The liquid when displaced from the pressure places by the presser tools which also generate the heat for welding, moves in the direction of the open end of the tubing and causes an overflow which has to be collected in a receptacle. In the production of containers which have to hold a predetermined quantity of liquid, the following must be observed:

The inner diameter of the thermoplastic tubing, the grade of elasticity of the thermplastic tubing, and the gravity pressure of the fluid substance in the filled tubing, must all be constant and the containers must be of the same shape and size; in this case the containers will all hold the same quantity of liquid.

The present invention relates to an improvement in machines such as produce liquid-filled packages from filled thermoplastic tubing.

According to this invention the apparatus consists of a pair of tools which are presser members and which displace the contents of the filled tubing. Said presser members are connected to an electrical heating device and after they have displaced the contents of the filled tubing from the pressure places, said tools generate the necessary heat to weld the contacting walls of the thermoplastic tubing together. To the said welding apparatus of the machine is coupled a device for feeding the thermoplastic tubing filled with fluid substance into the machine for the manufacture therefrom of filled and airtightly sealed packages. Said feeding device consists of a rotating holder with a vertical axle, said holder being provided with a supporting rim. The filled tubing is wound on to the holder and the sealed end of the filled tubing is guided to the machine part consisting in the main of a pair of presser members, and the open end of the filled tubing is engaged in the top end of a hollow vertical shaft. The inner pressure produced by the liquid at the sealed end of the tubing will depend on the relating vertical distance between the sealed end of the filled tubing and the highest point of the other end of the said tubing, and the lower end of the shaft being also open is provided to pass into a receptacle, and the overflow is guided therethrough into said receptacle.

A guiding device is provided for the filled tubing from the rotating holder to the packaging machine, such for example as rollers, and on unwinding the tubing the holder rotates on bearings.

In the following the invention will now be described with reference to the accompanying drawings:

In Figure 1 is shown in elevation and partially sectional view the packaging machine to which is coupled a device for storing the filled thermoplastic tubing.

Figure 2:
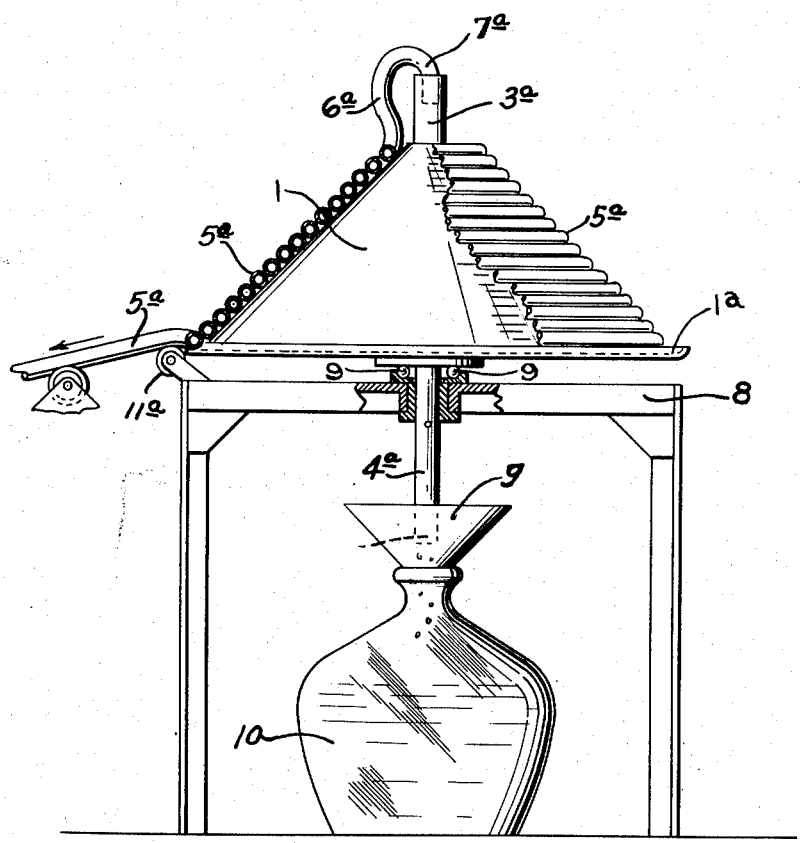

Figure 2 is a side elevational view with parts broken away and parts shown in section of a modified form of tube-holding device constructed in accordance with the present invention.

The storing device coupled to the machine shown in Figure 1 consists of a plate-shaped rotating holder 1 on which the filled tubing 5 is wound, the free end 6 of which is engaged by the bend 7 in the vertical axle 3, which is hollow, and the outlet 4 at the lower part of the vertical axle is over a funnel 9 in a receptacle 10.

The rotating holder is mounted on ball bearings 2 placed between the base of the holder and the fixed frame 8 which maintains the whole mechanism at a required height above the receptacle. It is of eminent importance that the device for storing, namely the rotating holder is at a vertical distance from the presser means.

The vertical axle 3 can be lowered or raised accordingly, to achieve a lower or higher gravity pressure in the filled tubing.

The sealed end of the tubing 5 is guided by a roller 12 between the presser members 13 and 14, which presser members are in the present case connected to a radio frequency generator 15.

In the present case the pressing means 13 and 14 meet on flattening the tubing where welding has to take place in a plane going through the axis of the tubing.

The machine is operated, in the present case by a mechanically driven rotating disc on which a cam 17 works together with a roller 18, which cam presses the two tool members 13 and 14 together with the length of filled tubing therebetween. A switch to contact the electric current is provided to close the electric circuit 16 after the presser members 13 and 14 have pressed away the contents in the tubing from the places where welding is required. The cam 20 on the rotating disc operates the transport mechanism to move the tubing between the pressing tools after they have opened for the tubing to move forward ready for the next welding. Naturally the welding construction can be of any other construction operated mechanically or by hand.

As illustrated in Figure 2 the modified form of device for storing the tubing is a rotating cone-shaped holder 1ª which in other structural aspects is similar to the holder of Figure 1.

The function of the machine is as follows:

A considerable length of tubing is filled in a separate operation, and sealed at one end, and is wound on to the rotating holder. The sealed end of the thermoplastic tubing 5 is guided to the sealing machine and when the presser members 13 and 14 apply pressure to the tubing walls and cause an over pressure in the tubing, the liquid substance contained in the tubing is forced toward the free open end 6 of the tubing, and as the displaced contents move backward, a quantity of fluid equal to that displaced, flows through the bend 7 into the hollow axle 3 and is guided into the receptacle 10. The tubing 5 is unwound step by step as the packages are produced by the packaging machine. Each time the tubing is engaged in the packaging machine, it moves forward over roller 11 and the holder 1 rotates slightly, freeing an equal length of tubing to that used for the production of each filled container. In this way the machine is fed with the tubing without difficulty and without risk of too strong pressure in the tubing or loss of the contents thereof.

What I claim is:

1. An improvement in a device for the production of liquid-filled containers made from a length of liquid-filled thermoplastic tubing whereby from said tubing by pressure and thereafter by heat action, liquid-filled containers are produced in seriatim, said improved device being characterized in that the machine for the manufacture of the containers filled with fluid substance is coupled to a device for feeding the thermoplastic tubing filled with fluid comprising a holder adapted to receive a coiled length of filled tubing, a vertical axle having a bore therethrough positioned to rotatably support said holder, said vertical axle being adapted to receive the free end of said filled tubing in the upper end of said bore, and liquid reclaiming means adapted to be associated with the lower end of said bore whereby as the liquid in said tubing is forced rearwardly of the length of tubing the accumulated displaced liquid will not increase the head pressure on the liquid in the tubing.

2. An improvement in a device for the production of liquid-filled containers in accordance with claim 1, wherein the hollow shaft rotates with the rotating holder of the tubing.

3. An improvement in a device for the production of liquid-filled containers, in accordance with claim 2, wherein the holder is plate-shaped and is provided with a supporting rim on the outermost circumference thereof.

4. An improvement in a device for the production of liquid-filled containers, wherein the holder is cone-shaped and the base of the cone is provided with a rim.

References Cited in the file of this patent

UNITED STATES PATENTS

| | | |
|---|---|---|
| 636,317 | Von Buhler | Nov. 7, 1899 |
| 2,469,975 | McCloy | May 10, 1949 |